(12) United States Patent
Ma et al.

(10) Patent No.: US 8,563,656 B1
(45) Date of Patent: *Oct. 22, 2013

(54) METHOD TO IMPROVE GREEN STRENGTH IN ELASTOMERS

(71) Applicant: The Goodyear Tire & Rubber Company, Akron, OH (US)

(72) Inventors: Liqing Ma, Fairlawn, OH (US); Ralf Mruk, Lipperscheid (LU); Bruce Raymond Hahn, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/671,593

(22) Filed: Nov. 8, 2012

(51) Int. Cl.
  C08F 8/00 (2006.01)
  C08L 9/00 (2006.01)
  C08L 9/02 (2006.01)
  C08L 25/02 (2006.01)
  C08L 47/00 (2006.01)

(52) U.S. Cl.
  USPC ............ 525/191; 525/193; 525/232; 525/233; 525/241

(58) Field of Classification Search
  USPC ............................ 525/191, 193, 232, 233, 241
  See application file for complete search history.

(56) References Cited

U.S. PATENT DOCUMENTS

| | | | |
|---|---|---|---|
| 3,627,837 A * | 12/1971 | Webb | 525/108 |
| 4,094,831 A | 6/1978 | Sandstrom | |
| 4,103,077 A | 7/1978 | O'Mahoney, Jr. | |
| 4,124,546 A | 11/1978 | Rubio, Jr. et al. | |
| 4,124,750 A | 11/1978 | O'Mahoney, Jr. | |
| 4,254,013 A | 3/1981 | Friedman et al. | |
| 4,307,210 A | 12/1981 | Gunesin et al. | |
| 4,338,425 A | 7/1982 | Dougherty et al. | |
| 4,363,897 A | 12/1982 | Gunesin et al. | |
| 4,366,291 A | 12/1982 | Gunesin et al. | |
| 4,373,068 A | 2/1983 | Gunesin et al. | |
| 4,414,359 A | 11/1983 | Dougherty et al. | |
| 4,414,374 A | 11/1983 | Gunesin et al. | |
| 4,446,282 A | 5/1984 | Jalics | |
| 4,574,140 A | 3/1986 | Sandstrom et al. | |
| 4,937,290 A | 6/1990 | Bauer et al. | |
| 5,387,631 A * | 2/1995 | Kawakami et al. | 524/260 |
| 6,486,213 B1 | 11/2002 | Chen et al. | |
| 7,847,019 B2 | 12/2010 | David et al. | |
| 8,415,432 B1 * | 4/2013 | Mruk et al. | 525/232 |

FOREIGN PATENT DOCUMENTS

| | | |
|---|---|---|
| EP | 0583814 | 2/1994 |
| EP | 0629649 | 12/1994 |
| JP | 60188411 | 9/1985 |

OTHER PUBLICATIONS

Kryger, Matt, "Applications of Thiol-ENE Coupling", Abstract, Dec. 11, 2008, pp. 1-8, Retrieved from the Internet, http://www.chemistry.illinois.edu/research/organic/seminar_extracts/2008_2009/Matt_Kryger_Chem535_FA08_Abstract.pdf *whole document*.
Moad, Graeme et al., "Living Radical Polymerization by the RAFT Process", Australian J. Chemistry 2005, vol. 58, pp. 379-410, Retrieved from the Internet: URL: http://www.publish.csiro.au/journals/ajc *whole document*.
Gerber, R. Eric et al., β-Mercaptopropionitrile (2-Cyanoethanethiol), Organic Synthesis, vols. 10 and 77, pp. 234 and 186.
Lutz, Jean-Francois, "Modular Chemical Tools for Advanced Macromolecular Engineering", Polymer, vol. 49, Issue 4, Feb. 18, 2008, pp. 817-824.
Harrisson, Simon, "Radical-Catalyzed Oxidation of Thiols by Trithiocarbonate and Dithioester RAFT Agents: Implications for the Preparation of Polymers with Terminal Thiol Functionality", Macromolecules, Jan. 13, 2009, Retrieved from the Internet: URL: http://www.pubs.acs.org *whole document*.
Brummelhuis, Niels ten et al., "Supporting Information to Thiol#Ene Modification of 1,2-Polybutadiene Using UV Light or Sunlight", pp. S1-S5.
Mori, Noriko, et al., "Temperature-Induced Changes in the Surface Wettability of SBR + PNIPA Films", Macromolecular Materials and Engineering, 2007, vol. 292, pp. 917-922, Retrieved from the Internet: URL: http://www.mme-journal.de *whole document*.
Brummelhuis, Niels ten et al., "Thiol#Ene Modification of 1,2-Polybutadiene Using UV Light or Sunlight", Macromolecules, 2008, 41, pp. 9946-9947, Retrieved from the Internet: URL: http://www.pubs.acs.org *whole document*.

* cited by examiner

Primary Examiner — Nathan M Nutter
(74) Attorney, Agent, or Firm — John D. DeLong

(57) ABSTRACT

The present invention is directed to a method of increasing the green strength of a rubber composition, comprising the step of combining in the rubber composition, a copolymer comprising: a polymeric backbone chain comprising a diene based elastomer selected from the group consisting of solution polymerized styrene butadiene rubber, emulsion polymerized styrene butadiene rubber, natural polyisoprene rubber, synthetic polyisoprene rubber, and polybutadiene; and polymeric sidechains bonded to the backbone chain, the sidechains comprising a polymer derived from an N-substituted monoalkyl acrylamide.

13 Claims, 3 Drawing Sheets

METHOD TO IMPROVE GREEN STRENGTH IN ELASTOMERS

BACKGROUND OF THE INVENTION

Science and technology in the elastomer field has developed to such an extent that synthetic elastomers have supplemented or replaced natural rubber to a great extent in the fabrication of tires and other rubber products. However, a major deficiency of synthetic elastomers is the lack of sufficient green strength required for satisfactory processing or building properties as in building tires. The abatement of this deficiency has long been sought by the art.

The term "green strength," while being commonly employed and generally understood by persons skilled in the rubber industry, is nevertheless a difficult property to precisely define. Basically, it is that property of an unvulcanized polymer common in natural rubber which, under normal building conditions where multiple components are employed, results in little or no unwanted distortion of any of the assembled components. Thus, with synthetic polymers or copolymers, adequate green strength, that is the requisite mechanical strength for processing and fabricating operations necessarily carried out prior to vulcanization, is lacking. That is, generally the maximum or "peak" stress which the unvulcanized materials will exhibit during deformation is rather low. Thus, unvulcanized strips or other forms of the elastomer are often distorted during processing or building operations. Although numerous additives and compounds have been utilized in association with various elastomers, substantial improvement in green strength has generally not been accomplished.

Green strength has generally been measured by stress/strain curves of unvulcanized compounds. Usually, the green strength of a compound is indicated by various properties of the stress/strain curve; typically, the average slope beyond the first peak or inflection of the curve, the (ultimate) tensile strength, and the ultimate elongation. Improvements in any one or more of these stress properties indicate improved green strength.

SUMMARY OF THE INVENTION

The present invention is directed to a method of increasing the green strength of a rubber composition, comprising the step of combining in the rubber composition, a copolymer comprising: a polymeric backbone chain comprising a diene based elastomer selected from the group consisting of solution polymerized styrene butadiene rubber, emulsion polymerized styrene butadiene rubber, natural polyisoprene rubber, synthetic polyisoprene rubber, and polybutadiene; and polymeric sidechains bonded to the backbone chain, the sidechains comprising a polymer derived from a monoalkyl acrylamide.

DETAILED DESCRIPTION

Figure 1:
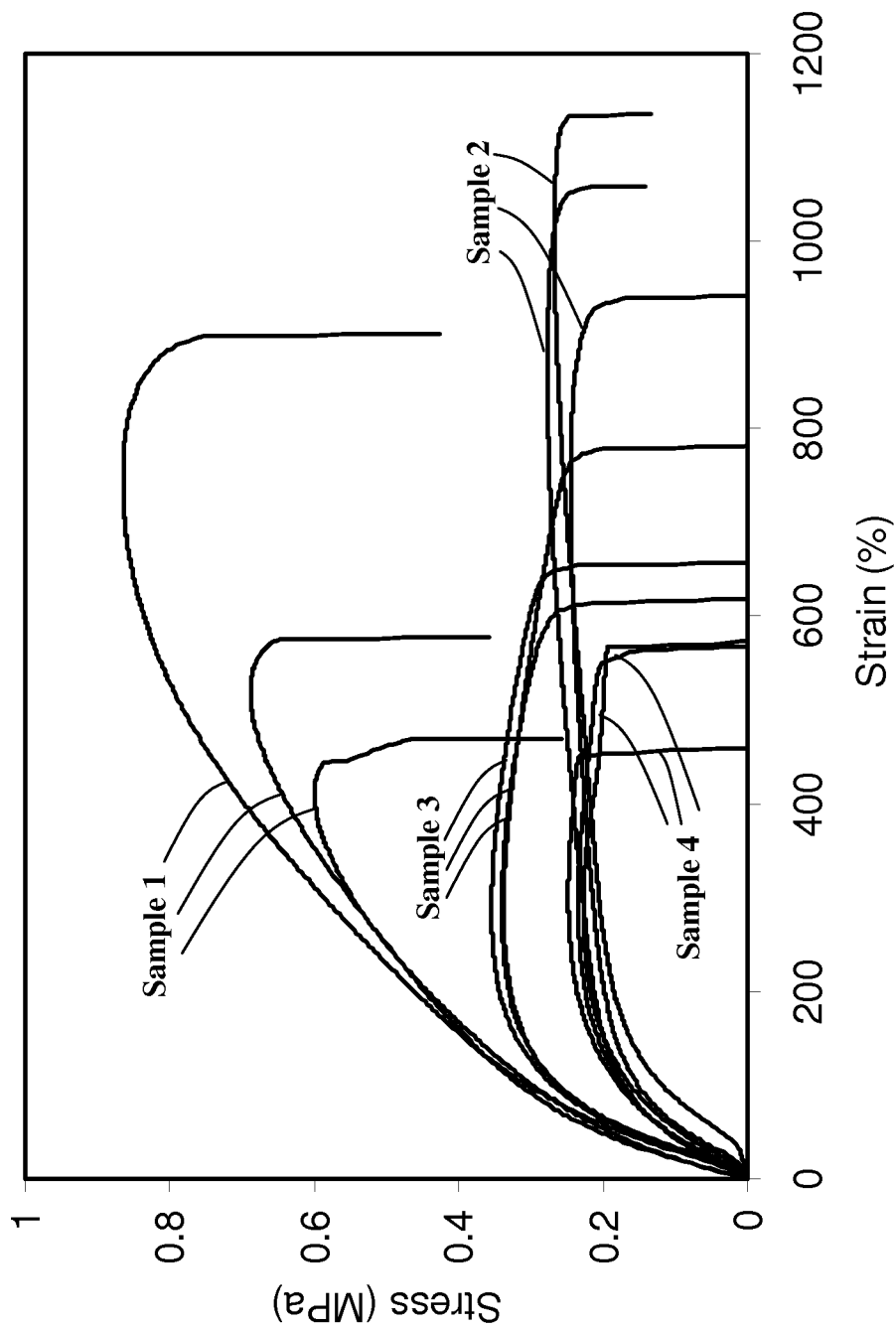
FIG. 1 shows stress versus strain curves for various rubber samples

The present invention is directed to a method of increasing the green strength of a rubber composition, comprising the step of combining in the rubber composition, a copolymer comprising: a polymeric backbone chain comprising a diene based elastomer selected from the group consisting of solution polymerized styrene butadiene rubber, emulsion polymerized styrene butadiene rubber, natural polyisoprene rubber, synthetic polyisoprene rubber, and polybutadiene; and polymeric sidechains bonded to the backbone chain, the sidechains comprising a polymer derived from an N-substituted monoalkyl acrylamide.

In one embodiment, the copolymer has the structure I

where X is a polymer derived from a monomer comprising at least one conjugated diene monomer and optionally at least one vinyl aromatic monomer; Z is a polymer derived from a monoalkyl acrylamide; Y is a divalent group bonded to both X and Z; and n is the number of $-[-Y-Z]$ groups bonded to X.

In one embodiment, the polymer X is a diene based elastomer comprising at least one carbon-carbon double bond. The phrases "rubber or elastomer containing olefinic unsaturation" or "diene based elastomer" as used herein are equivalent and are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic rubbers are the homopolymerization products of butadiene and its homologues and derivatives, for example, methylbutadiene (i.e., isoprene), dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In one embodiment, the polymer Z is a polymer of a second monomer of formula II

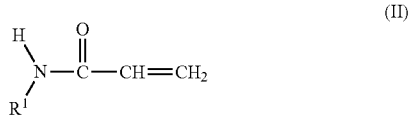

(II)

where $R^1$ is selected from the group consisting of hydrogen, C1 to C6 linear alkyl, C3 to C6 branched alkyl, and C3 to C6 cycloalkyl.

In one embodiment, Z is of formula (III)

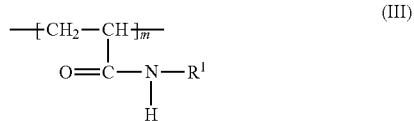

(III)

where $R^1$ is selected from the group consisting C1 to C6 linear alkyl, C3 to C6 branched alkyl, and C3 to C6 cycloalkyl, and m is the degree of polymerization of the hydrocarbon chain.

In one embodiment, the polymer Z is a polymer of an N-substituted monoalkyl acrylamide derivative.

In one embodiment, the polymer Z is a polymer of N-isopropylacrylamide, N-cyclopropylacrylamide, N-methylacrylamide, or N-ethylacrylamide.

In one embodiment, Z is selected from the group consisting of poly(N-isopropylacrylamide), poly(N-methylacrylamide), and poly(N-ethylacrylamide).

In one embodiment, the polymer Z has a weight average molecular weight ranging from about 500 to about 20000 g/mol.

In one embodiment, the copolymer comprises from about 0.5 to about 20 weight percent Z.

Y is a divalent group bonded to both X and Z. In one embodiment, Y is sulfur or oxygen. In one embodiment, Y is sulfur.

Generally, Y originates as a terminal functional group of the polymer Z capable of reacting with a carbon-carbon double bond of the polymer X. Thus, as it exists in the copolymer Y links X to Z. In one embodiment, the terminal functional group is a thiol group. Such a terminal functional group may be incorporated into the polymer Z during polymerization, for example, through use of a suitable chain transfer agent or terminating agent as is known in the art.

The number n of $\mathrm{+[Y{-}Z]}$ groups bonded to X ranges from about 1 to about 40 in a given copolymer molecule.

The copolymer may be produced by various methods. In one embodiment, the copolymer may be produced by functionalizing the polymer X with side chains of polymer Z to produce a graft copolymer with an elastomer backbone and polymer sidechains. A convenient way for the functionalization of a variety of elastomers is the thiol-ene reaction during which alkene moieties being present in the elastomers are transformed into thioethers by reaction with thiols. This reaction proceeds preferably with vinyl groups as they are present in styrene-butadiene rubbers, butadiene rubbers, and polyisoprene rubbers. In order to allow the functionalization of the elastomers, the polymers may feature thiol end groups. These can be introduced by reaction of thiocarbonylthio endgroups with nucleophilic agents. Polymers exhibiting thiocarbonylthio end groups can be produced by reversible addition-fragmentation chain transfer (RAFT) polymerization. One reaction scheme describes the use of PNIPAM as the polymer, however, this invention is not limited to that as any polymer derived from a monoalkyl acrylamide with a reactive end group, which for example can be produced by RAFT polymerization, can be used for the functionalization of the elastomer.

One step of the method to produce the graft copolymer is to obtain, a first polymer comprising at least one carbon-carbon double bond.

A second step of the method is obtaining a second polymer comprising a terminal functional group capable of reacting with the carbon-carbon double bond of the first polymer.

In one embodiment, the second polymer is obtained by polymerizing a second monomer in the presence of a thiocarbonylthio RAFT chain transfer agent to form a polymer comprising a terminal thiocarbonylthio group; and cleaving the terminal thiocarbonylthio group to a thiol group to form the second polymer comprising a terminal thiol group.

In one embodiment, the terminal functional group of the second polymer is incorporated in the second polymer during polymerization through the mechanism of reversible addition-fragmentation chain transfer (RAFT). More details of the RAFT polymerization mechanism may be found by reference to Moad et al., *Aust. J. Chem.* 2005, 58, 379-410. As is known in the art, RAFT polymerization of free-radical polymerizable monomers is accomplished in the presence of a thiocarbonylthio RAFT chain transfer agent of general formula (IV)

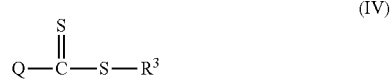

(IV)

where $R^3$ is a free radical leaving group able to reinitiate polymerization, and Q is a functional group that influences the rate of radical addition and fragmentation. Suitable thiocarbonylthio RAFT chain transfer agents include dithioesters, trithiocarbonates, dithiocarbamates, and xanthates. In one embodiment, the thiocarbonylthio chain transfer agent is a trithiocarbonate. In one embodiment, the thiocarbonylthio chain transfer agent is selected from the group consisting of S-1-dodecyl-S-(αα'-dimethyl-α''-acetic acid) trithiocarbonate and 4-cyano-4-dodecylsulfanylthiocarbonylsulfanyl-4-methyl butyric acid.

Upon RAFT polymerization in the presence of a suitable thiocarbonylthio chain transfer agent, the chain-terminated polymer has the general formula (V)

(V)

where $P_n$ represents the polymer chain derived from a monoalkyl acrylamide.

The chain terminated polymer of formula V is then reacted with a suitable nucleophile to cleave the C—S linkage to obtain a second polymer of formula (VI) having a terminal thiol group H—S—$P_n$  (VI)

In one embodiment, the chain terminated polymer of formula V is treated by aminolysis to obtain the thiol-terminated polymer of formula VI.

A third step of the method is reacting the second polymer with the first polymer to form a graft copolymer, the graft copolymer comprising a backbone derived from the first polymer and sidechains derived from the second polymer. During reacting of the second polymer with the first polymer, a second polymer is linked to the first polymer through reaction of a terminal functional group of the second polymer with the unsaturated carbon-carbon bond of the first polymer.

In one embodiment, the thiol-terminated second polymer is reacted with the first polymer in the presence of a free-radical initiator via a thiol-ene reaction as is known in the art, see for example *Macromolecules* 2008, 41, 9946-9947. In one embodiment, the free-radical initiator is selected from the group consisting of 2,4,6-Trimethylbenzoyldiphenylphosphine oxide and azobisisobutyonitrile (AIBN).

The invention is further illustrated by the following non-limiting examples.

EXAMPLE 1

In this example, preparation of poly-(N-isopropylacrylamide), or PNIPAM, is illustrated.

RAFT-polymerization was used for the preparation of PNIPAM. For this purpose the following chain transfer agent (CTA) were prepared: 4-Cyano-4-dodecylsulfanylthiocarbonylsulfanyl-4-methyl butyric acid (CDSMB).

The RAFT reaction scheme is as follows:

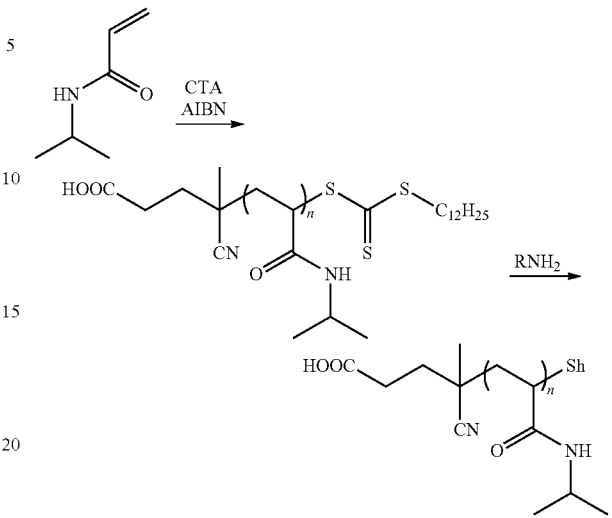

Synthesis of Chain Transfer Agent (CDSMB)

4-Cyano-4-dodecylsulfanylthiocarbonylsulfanyl-4-methyl butyric acid was synthesized in two steps. The first step was prepared using literature procedure [W. G. Weber, J. B. McLeary, R. D. Sanderson, *Tetrahedron Lett.* 2006, 47, 4771.].

Step 1: Bis-(dodecylsulfanylthiocarbonyl)disulfid

Yield: 72%
$^1$H-NMR (CDCl$_3$/300 MHz): δ[ppm]: 0.86 (t, 6H); 1.11-1.43 (m, 36H); 1.65 (q, 4H); 2.66 (t, 4H)

Step 2: 4-Cyano-4-dodecylsulfanylthiocarbonyl-sulfanyl-4-methyl butyric acid 10 g of Bis-(dodecylsulfanylthiocarbonyl)disulfide and 7.7 g of 4,4'-azobis(4-cyano)pentaneacid were dissolved in 60 ml of freshly distilled dioxane. The mixture was degassed under a stream of argon for one hour and heated at 80° C. under argon atmosphere for 21 hours. The solvent was evaporated and the resulting dark orange oil was recrystallized from hexanes twice.

Yield: 52%
$^1$H-NMR (CDCl$_3$/300 MHz): δ[ppm]: 0.87 (t, 3H); 1.12-1.45 (m, 18H); 1.68 (q, 2H); 1.87 (s, 3H); 2.30-2.63 (m, 2H), 2.68 (t, 2H); 3.32 (t, 2H)

Synthesis of PNIPAM-CTA

All NIPAM-polymers were prepared in a Schlenk tube containing N-isopropyacrylamide, CTA, AIBN and dry dioxane as a solvent. The exact amount of all components is given in Table 1. After three freeze-pump thaw cycles the mixture was placed in a preheated oil bath at 80° C. for 20 hours. The mixture was precipitated in hexane (poor solvent)/THF (good solvent) three times and dried under vacuum. Table 2 further shows the amount of used NIPAM (N-isopropylacrylamide) monomer, CTA (DMP or CDSMB), AIBN and dioxane. The yield refers to the amount of monomer used. Molecular weights were measured by GPC in DMF using PMMA as calibration.

TABLE 1

| Sample | NIPAM/ mmol | CDSMB/ mmol | AIBN/ mmol | Dioxane/ ml | Yield/% | M (calc.)/ (g/mol) | M (GPC)/ (g/mol) | PDI |
|---|---|---|---|---|---|---|---|---|
| PNI 4 | 8.8 | 0.18 | 0.02 | 6 | 96 | 5658 | 4727 | 1.17 |
| PNI 5 | 8.8 | 0.10 | 0.01 | 6 | 89 | 10184 | 6096 | 1.18 |
| PNI 6 | 8.8 | 0.18 | 0.02 | 6 | 98 | 5658 | 4723 | 1.16 |
| PNI 7 | 8.8 | 0.09 | 0.01 | 6 | 96 | 11316 | 5905 | 1.13 |
| PNI 8 | 17.7 | 0.29 | 0.03 | 8 | 96 | 6790 | 5749 | 1.19 |
| PNI 9 | 17.7 | 0.25 | 0.03 | 8 | 92 | 7921 | 5202 | 1.17 |
| PNI 10 | 17.7 | 0.20 | 0.02 | 8 | 93 | 10184 | 6785 | 1.37 |
| PNI 11 | 17.7 | 0.59 | 0.06 | 8 | 99 | 3395 | 3055 | 1.14 |

The cleavage of the trithiocarbonate end group was done by aminolysis. The aminolysis was performed by stirring a mixture of PNIPAM-CTA, tributylphosphine and amine in THF for several hours at room temperature. The transformation to the thiol-group was tested with two amines: ethanolamine and hexylamine.

Kinetic measurements by UV-vis spectroscopy confirmed the completeness of the reaction after one hour. The spectrum was measured every 15 minutes after adding the amine to the solution of the polymer.

The cleavage of the trithiocarbonate-group was confirmed by UV-vis spectroscopy for both amines by absence of the absorption band at 310 nm (C=S). For further studies hexylamine was chosen for the cleavage because of its good solubility in hexane, which was used to precipitate the polymer after the reaction.

EXAMPLE 2

In this example, functionalization of a styrene-butadiene rubber with PNIPAM is illustrated.

Synthesis of Functionalized Rubber Elastomers

Functionalized elastomer was produced using the following general procedure: A solution of SBR, AIBN and the thiol-functionalized PNIPAM from Example 1 in dry THF was degassed under argon atmosphere at room temperature for 2 hours. The exact amount of educts for each reaction is shown in Table 3. The reaction mixture was then placed in a preheated oil bath at 70° C. for at least 20 hours. To make sure that no free thiol was in the reaction product, the product was dialyzed against THF for three days. After the dialysis the solvent was evaporated and the product was dried under vacuum. The results of the elementary analysis of three functionalized elastomers are shown in Table 4, with the calculated weight percent of PNIPAM in the resulting functionalized SBR.

TABLE 3

| Sample | weight PNIPAM/ (SBR) | PNIPAM used [1] | mass SBR/ g | mass AIBN/ g | mass thiol/ g | M (PNIPAM-SH)/ (g/mol) |
|---|---|---|---|---|---|---|
| SBR 1 | 20 | PNI6 | 1.0 | 0.027 | 0.20 | 4723 |
| SBR 2 | 20 | PNI7 | 1.0 | 0.027 | 0.20 | 5950 |
| SBR 3 | 10 | PNI8 | 1.0 | 0.022 | 0.10 | 5749 |
| SBR 4 | 15 | PNI8 | 1.0 | 0.023 | 0.15 | 5749 |
| SBR 5 | 5 | PNI8 | 1.0 | 0.020 | 0.05 | 5749 |

[1] from Example 1

TABLE 4

| Sample | SBR | SBR 3 | SBR 4 | SBR 5 |
|---|---|---|---|---|
| Measurement 1 | 3.753 mg | 6.968 mg | 3.472 mg | 1.344 mg |
| C/% | 89.72 | 86.95 | 85.05 | 88.21 |
| H/% | 10.50 | 10.20 | 10.14 | 8.87 |
| N/% | 0 | 1.03 | 1.29 | 0.42 |
| S/% | 0 | 0.08 | 0.29 | 0.32 |
| PNIPAM in SBR/ wt % | | 8.32 | 10.42 | 3.39 |
| Measurement 2 | 4.882 mg | 2.812 mg | 5.129 mg | 1.164 mg |
| C/% | 89.75 | 86.81 | 85.03 | 87.92 |
| H/% | 10.48 | 10.50 | 10.17 | 9.07 |
| N/% | 0 | 1.01 | 1.30 | 0.35 |
| S/% | 0 | 0.12 | 0.12 | 0.30 |
| PNIPAM in SBR/ wt % | | 8.16 | 10.50 | 2.83 |

EXAMPLE 3

In this example, the effect of PNIPAM functionalization on the green strength of an elastomer is illustrated, and compared to unfunctionalized SBR and natural rubber.

PNIPAM-functionalized SBR was prepared following the procedures of Examples 1 and 2 using an SBR with Mn of about 109,000 and polydispersity of 1.71. The prepared PNIPAM contained approximately 40 repeat units of NIPAM per chain, with about 2.5 weight percent of PNIPAM grafted onto the functionalized elastomer.

The functionalized SBR sample (Sample 1) was milled and hot-pressed to form a flat sheet. Three dump-bell shaped samples were cut and used to run the tensile tests. For comparison, non-functionalized emulsion SBR (Goodyear PLF 1502, Sample 2), solution SBR(SLF16S42, Sample 3) and synthetic polyisoprene (Goodyear Natsyn 2200, Sample 4) were tested under the same conditions. Results are shown in FIG. 1. As seen in FIG. 1, the higher ultimate tensile stress measured for the functionalized SBR indicates that the green strength of PNIPAM functionalized SBR is significantly stronger than other three elastomers.

EXAMPLE 4

In this example, mixing and cure of a PNIPAM-functionalized SBR is illustrated. The functionalized SBR of Example 3 was mixed in a rubber compound in a three-step mix procedure with two non productive steps and one productive mix step, with the composition as given in Table 5. Emulsion and solution SBR samples were also compounded, as shown in Table 5.

TABLE 5

| Sample No. | 5 | 6 | 7 |
|---|---|---|---|
| E-SBR[1] | 70 | 0 | 0 |
| S-SBR[2] | 0 | 70 | 0 |
| PNIPAM-SBR[3] | 0 | 0 | 70 |
| Polybutadiene[4] | 30 | 30 | 30 |
| Silica | 65 | 65 | 65 |
| Carbon Black | 5.2 | 5.2 | 5.2 |
| Oil | 12 | 12 | 12 |
| Fatty Acid | 2 | 2 | 2 |
| Silane Polysulfide | 5.2 | 5.2 | 5.2 |
| Zinc Oxide | 3.5 | 3.5 | 3.5 |
| Antidegradants | 2.75 | 2.75 | 2.75 |
| Sulfur | 1.6 | 1.6 | 1.6 |
| Accelerators | 3.6 | 3.6 | 3.6 |

[1]PLF1520, cold process emulsion styrene-butadiene rubber with 23.5 percent styrene, from The Goodyear Tire & Rubber Co.
[2]SLF16S42, tin coupled, low styrene medium vinyl solution styrene-butadiene rubber, from The Goodyear Tire & Rubber Co.
[3]PNIPAM functionalized SBR from Example 3 with 2.5 percent by weight of PNIPAM and 40 repeat units per PNIPAM chain.
[4]BUD1207, high cis (98%) polybutadiene, from The Goodyear Tire & Rubber Co.

Figure 2:
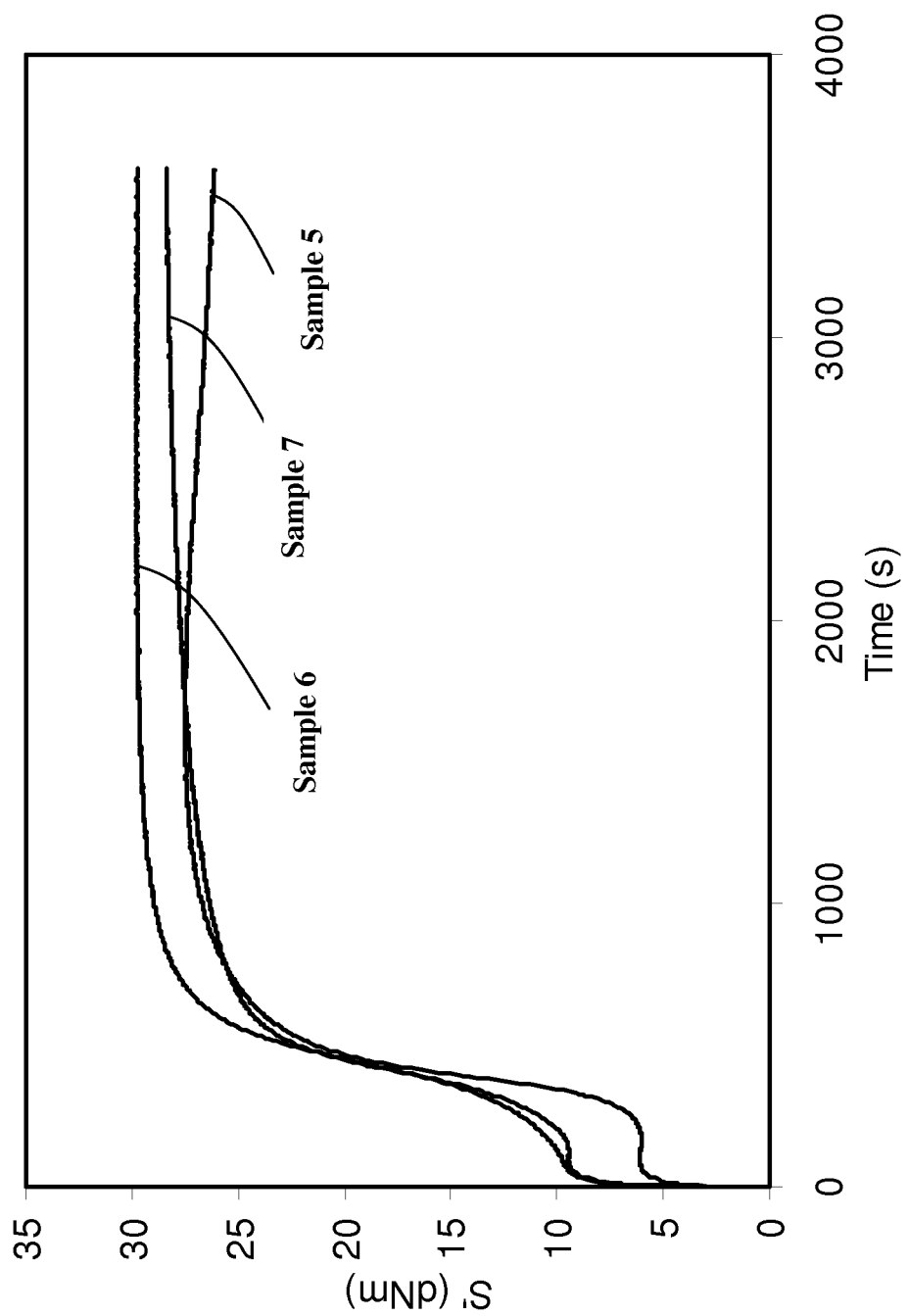
FIG. 2 shows stress versus strain curves for various rubber samples.

The rubber compounds of Table 1 were evaluated for cure properties using a dynamic rheometer (MDR) at 150° C. for 1 hour, with results shown in FIG. 2. As seen in FIG. 2, the PNIPAM functionalized SBR showed similar cure behavior to the non functionalized elastomers.

EXAMPLE 5

In this example, the effect of PNIPAM functionalization on the green strength of an elastomer is illustrated, and compared to SBR functionalized with a dialkyl acrylamide polymer.

PNIPAM-functionalized SBR was prepared following the procedures of Examples 1 and 2 using an SBR with Mn of about 110,000. The prepared PNIPAM contained approximately 20 repeat units of NIPAM per chain. Three samples of PNIPAM functionalized SBR were prepared, containing 1, 2 and 4 percent by weight of PNIPAM respectively as shown in Table 5.

For comparison, SBR functionalized with a poly(N,N-diethylacrylamide) was also prepared. The prepared poly(N,N-diethylacrylamide) PDEAM contained approximately 20 repeat units of DEAM per chain. Two samples of PDEAM functionalized SBR were prepared, containing 3 and 6 percent by weight of PDEAM respectively as shown in Table 6.

TABLE 6

| Sample No. | NIPAM units/ PNIPAM | Wt % PNIPAM | DEAM units/ PDEAM | Wt % PDEAM |
|---|---|---|---|---|
| 8 | 0 | 0 | 0 | 0 |
| 9 | 20 | 1 | 0 | 0 |
| 10 | 20 | 2 | 0 | 0 |
| 11 | 20 | 4 | 0 | 0 |
| 12 | 0 | 0 | 20 | 3 |
| 13 | 0 | 0 | 20 | 6 |

Figure 3:
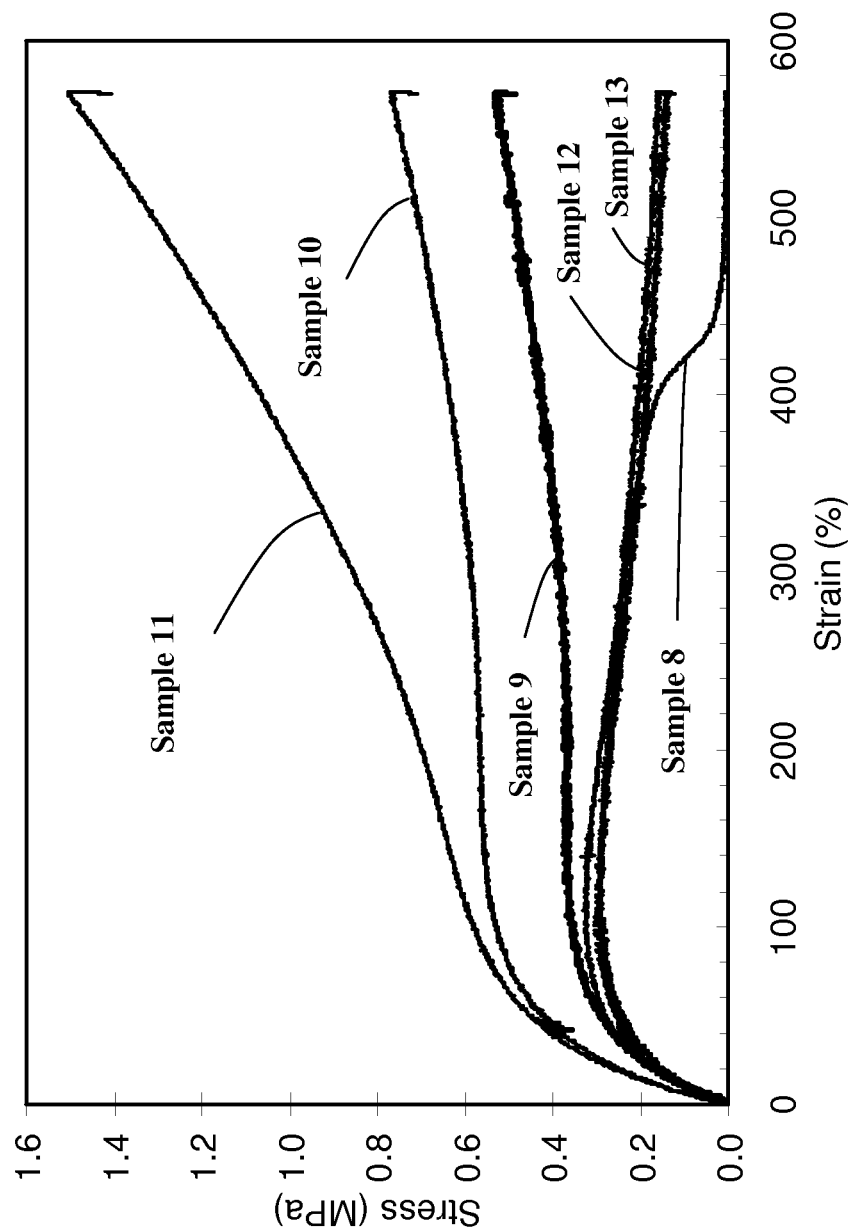
FIG. 3 shows stress versus strain curves for various rubber samples.

The functionalized SBR of Table 6 were evaluated for green strength by tensile tests. Homogenized polymer sheet (~1 mm thick) was prepared from a solution casting method, by slow evaporation of the solvent of polymer/THF solution. Test results are shown in FIG. 3. As seen in FIG. 3, the PNIPAM functionalized SBR (Samples 9, 10 and 11) showed increased green strength compared to the control SBR (Sample 8), as indicated by the higher ultimate stress. Surprisingly, the comparative PDEAM functionalized SBR (Samples 12 and 13) showed such no improvement in green strength as compared with the control SBR.

What is claimed is:

1. A method of increasing the green strength of a rubber composition, comprising the step of combining in the rubber composition, a copolymer comprising: a polymeric backbone chain comprising a diene based elastomer selected from the group consisting of solution polymerized styrene butadiene rubber, emulsion polymerized styrene butadiene rubber, natural polyisoprene rubber, synthetic polyisoprene rubber, and polybutadiene; and polymeric sidechains bonded to the backbone chain, the sidechains comprising a polymer derived from an N-substituted monoalkyl acrylamide.

2. A method of increasing the green strength of a rubber composition, comprising the step of combining in the rubber composition, a copolymer comprising the structure

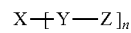

where X is a polymer derived from a monomer comprising at least one conjugated diene monomer and optionally at least one vinyl aromatic monomer;

Z is a polymer derived from a monomer of formula

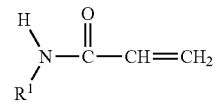

where $R^1$ is selected from the group consisting of hydrogen, C1 to C6 linear alkyl, C3 to C6 branched alkyl, and C3 to C6 cycloalkyl;

Y is a divalent group bonded to both X and Z; and n is the non-zero number of —[—Y—Z] groups bonded to X.

3. The method of claim 2, wherein the at least one conjugated diene monomer is selected from the group consisting of isoprene and butadiene.

4. The method of claim 2, wherein the vinyl aromatic monomer is styrene.

5. The method of claim 2, wherein X is selected from the group consisting of solution polymerized styrene-butadiene rubber, emulsion polymerized styrene-butadiene rubber, polybutadiene, natural polyisoprene rubber, and synthetic polyisoprene rubber.

6. The method of claim 2, wherein Z is selected from the group consisting of poly(N-isopropylacrylamide), poly(N-cyclopropylacrylamide), poly(N-methylacrylamide), and poly(N-ethylacrylamide).

7. The method of claim 2, wherein Y is a divalent group selected from the group consisting of sulfur and oxygen.

8. The method of claim 2, comprising from about 0.5 to about 20 weight percent Z.

9. The method of claim 2, wherein n ranges from about 1 to about 40.

10. The method of claim 2, wherein the vinyl aromatic monomer is styrene, the conjugated diene monomer is butadiene, Y is divalent sulfur, and Z is derived from N-isopropylacrylamide.

11. The method of claim 2, wherein the conjugated diene monomer is isoprene, Y is divalent sulfur, and Z is derived from N-isopropylacrylamide.

12. The method of claim 2, wherein the conjugated diene monomer is butadiene, Y is divalent sulfur, and Z is derived from N-isopropylacrylamide.

13. The method of claim 2, wherein Z is of formula
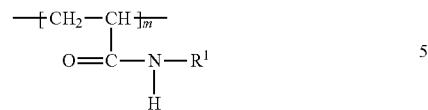
where $R^1$ is selected from the group consisting C1 to C6 linear alkyl, C3 to C6 branched alkyl, and C3 to C6 cycloalkyl, and m is the degree of polymerization of the hydrocarbon chain.
\* \* \* \* \*